US009336279B2

(12) United States Patent
Ciccolo et al.

(10) Patent No.: US 9,336,279 B2
(45) Date of Patent: *May 10, 2016

(54) HIDDEN TEXT DETECTION FOR SEARCH RESULT SCORING

(71) Applicant: GOOGLE INC., Mountain View, CA (US)

(72) Inventors: Peter Ciccolo, Mountain View, CA (US); Michael Edward Flaster, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/164,373

(22) Filed: Jan. 27, 2014

(65) Prior Publication Data

US 2015/0161135 A1 Jun. 11, 2015

Related U.S. Application Data

(63) Continuation of application No. 13/465,235, filed on May 7, 2012, now Pat. No. 8,639,680.

(51) Int. Cl.
*G06F 17/30* (2006.01)
*G06F 17/22* (2006.01)

(52) U.S. Cl.
CPC ...... *G06F 17/3053* (2013.01); *G06F 17/30867* (2013.01); *G06F 17/2247* (2013.01); *G06F 17/30861* (2013.01); *G06F 17/30864* (2013.01); *G06F 17/30893* (2013.01)

(58) Field of Classification Search
CPC .......... G06F 17/2247; G06F 17/30864; G06F 17/30893; G06F 17/30861; G06F 17/30867
USPC ................. 707/705–710, 722–723, 769–770; 709/201, 203, 213, 217
See application file for complete search history.

(56) References Cited

U.S. PATENT DOCUMENTS 5,649,023 A * 7/1997 Barbara et al. ................ 382/159
5,835,904 A 11/1998 Vicik et al.
(Continued)

FOREIGN PATENT DOCUMENTS

GB 2379291 A * 3/2003
WO WO 2009049275 A1 * 4/2009

OTHER PUBLICATIONS

Turpin et al.; Fast Generation of Result Snippets in Web Search; Proceedings of the 30th Annual International ACM SIGIR Conference on Research and Development in Information Retrieval; pp. 127-134; Jul. 23-27, 2007.

(Continued)

*Primary Examiner* — Frantz Coby
(74) *Attorney, Agent, or Firm* — Fish & Richardson P.C.

(57) ABSTRACT

A method for creating a hidden text data index for ranking computerized query search results that includes generating a render tree based on a document object model (DOM) tree for a web page. The render tree includes nodes that correspond to text that will be visually displayed by a client device when executed. The method includes comparing nodes corresponding to text of the DOM tree with the nodes corresponding to text of the render tree to identify the nodes in the DOM tree that will not be visually displayed when executed by the client device. The method also includes creating a hidden text data index for the nodes corresponding to text of the DOM tree not in the render tree. The hidden text data index identifies nodes corresponding to text of the DOM tree as hidden that will not be visually displayed when executed by the client device.

20 Claims, 11 Drawing Sheets

(56) References Cited

U.S. PATENT DOCUMENTS

| | | | |
|---|---|---|---|
| 6,185,612 B1* | 2/2001 | Jensen et al. | 709/223 |
| 6,571,249 B1 | 5/2003 | Garrecht et al. | |
| 6,643,652 B2 | 11/2003 | Helgeson et al. | |
| 6,738,759 B1 | 5/2004 | Wheeler et al. | |
| 6,763,388 B1* | 7/2004 | Tsimelzon | 709/228 |
| 6,873,982 B1 | 3/2005 | Bates et al. | |
| 7,089,583 B2 | 8/2006 | Mehra et al. | |
| 7,243,095 B2 | 7/2007 | Chang et al. | |
| 7,246,128 B2 | 7/2007 | Jordahl | |
| 7,346,605 B1* | 3/2008 | Hepworth et al. | |
| 7,433,820 B2* | 10/2008 | Garg et al. | 704/256.8 |
| 7,577,643 B2 | 8/2009 | Dominowska et al. | |
| 7,668,888 B2 | 2/2010 | Irle et al. | |
| 7,680,851 B2 | 3/2010 | Liu et al. | |
| 7,730,054 B1* | 6/2010 | Marmaros et al. | 707/713 |
| 7,860,815 B1 | 12/2010 | Tangirala | |
| 7,983,915 B2 | 7/2011 | Knight et al. | |
| 8,005,842 B1 | 8/2011 | Pasca et al. | |
| 8,200,527 B1 | 6/2012 | Thompson et al. | |
| 8,265,778 B2 | 9/2012 | Taylor et al. | |
| 8,392,823 B1* | 3/2013 | Schneider et al. | 715/234 |
| 8,639,680 B1* | 1/2014 | Ciccolo | G06F 17/3053 707/705 |
| 8,793,239 B2* | 7/2014 | Dalvi et al. | 707/709 |
| 2005/0080774 A1 | 4/2005 | Janssen et al. | |
| 2005/0149576 A1 | 7/2005 | Marmaros et al. | |
| 2006/0004725 A1 | 1/2006 | Abraido-Fandino | |
| 2007/0100862 A1 | 5/2007 | Reddy et al. | |
| 2007/0239741 A1 | 10/2007 | Jordahl | |
| 2007/0282772 A1* | 12/2007 | Lee et al. | 706/25 |
| 2008/0104542 A1 | 5/2008 | Cohen et al. | |
| 2008/0140626 A1* | 6/2008 | Wilson | 707/3 |
| 2008/0313167 A1* | 12/2008 | Anderson | 707/5 |
| 2009/0259646 A1 | 10/2009 | Fujita et al. | |
| 2009/0265290 A1* | 10/2009 | Ciaramita et al. | 706/12 |
| 2010/0094860 A1 | 4/2010 | Lin et al. | |
| 2010/0174719 A1 | 7/2010 | Vilches | |
| 2010/0262458 A1 | 10/2010 | Schwarz et al. | |
| 2010/0262510 A1 | 10/2010 | Schwarz et al. | |
| 2011/0035364 A1* | 2/2011 | Lipsey | 707/690 |
| 2011/0184893 A1 | 7/2011 | Paparizos et al. | |
| 2011/0196733 A1 | 8/2011 | Li et al. | |
| 2011/0218990 A1 | 9/2011 | Jordahl | |
| 2011/0270672 A1 | 11/2011 | Hillard et al. | |
| 2012/0173500 A1 | 7/2012 | Chakrabarti et al. | |
| 2013/0167156 A1* | 6/2013 | Ressler et al. | 719/313 |

OTHER PUBLICATIONS

Kovacevic et al.; Recognition of Common Areas in a Web Page Using Visual Information: A Possible Application in a Page Classification; IEEE International Conference on Data Mining; pp. 250-257; Mar. 10, 2003.

Yang et al.; HTML Page Analysis Based on Visual Cues; IEEE Sixth International Conference on Document Analysis and Recognition; pp. 859-864; Sep. 10-13, 2001.

* cited by examiner

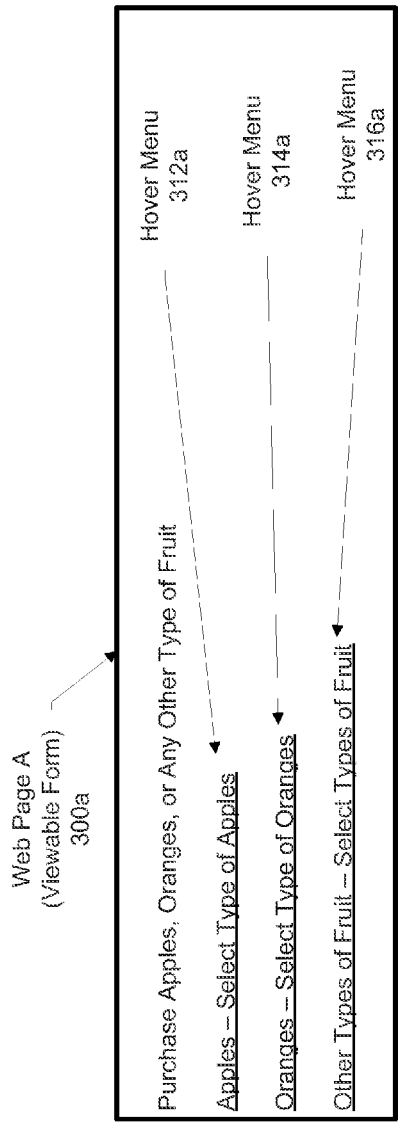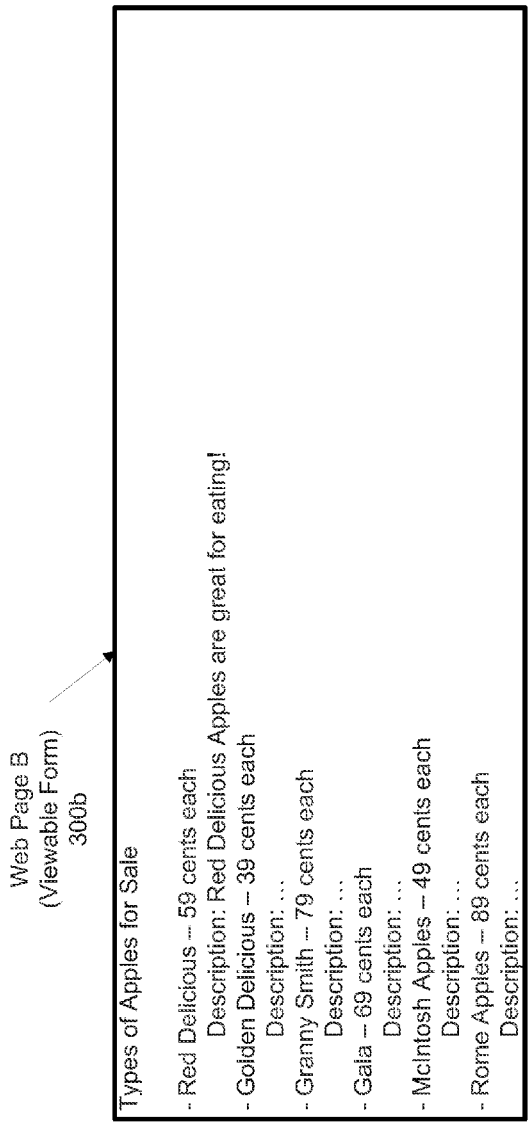
FIG. 3A
FIG. 3B

Web Page A
(HTML Form)
300c

```
<html>
<body>
<h1> Purchase Apples, Oranges, or Any Other Type of Fruit </h1>
<form action = "Apples -- Select Type of Apples">
    <select name = "Apples">
        <option value = "Red Delicious"> Red Delicious -- 59 cents each </option>
        <option value = "Golden Delicious"> Golden Delicious -- 39 cents each </option>
        <option value = "Granny Smith"> Granny Smith -- 79 cents each </option>
        <option value = "Gala"> Gala -- 69 cents each </option>
        <option value = "McIntosh Apples"> McIntosh Apples -- 49 cents each </option>
        <option value = "Rome Apples"> Rome Apples -- 89 cents each </option>
    </select>
</form>
...
```

Hidden Text
310c

FIG. 3C

```
Web Page B
(HTML Form)
300d

<html>
<body>
<h1>Types of Apples for Sale</h1>
<p>
- Red Delicious -- 59 cents each
    Description: Red Delicious Apples are great for eating!
- Golden Delicious -- 39 cents each
    Description: ...
- Granny Smith -- 79 cents each
    Description: ...
- Gala -- 69 cents each
    Description: ...
- McIntosh Apples -- 49 cents each
    Description: ...
- Rome Apples -- 89 cents each
    Description: ...
</p>
</body>
</html>
```

FIG. 3D

HIDDEN TEXT DETECTION FOR SEARCH RESULT SCORING

RELATED APPLICATION

This application is a continuation of U.S. patent application Ser. No. 13/465,235, filed May 7, 2012 (now U.S. Pat. No. 8,639,680), the disclosure of which is incorporated herein by reference.

BACKGROUND

Search engines provide search results pages in response to user queries. A search results page includes search results for web pages responsive to a query. Each result can include, for example, a title of the page, a link to the page, and a short textual description, or snippet, for the page.

Some text in the HTML of a web page may not be immediately visible to users viewing the web page. The text that is not visible to the user may not be a good representation of the content of the page as a whole.

SUMMARY

One implementation features a method for providing computerized search results to a user. The method includes generating, by a system of one or more computers, a first data structure based on a web page, where the first data structure includes nodes corresponding to text that will be visually displayed from the web page and nodes corresponding to text that will not be visually displayed from the web page when executed by a client device. The method also includes generating, by the system of one or more computers, a second data structure for the web page based on the first data structure, the second data structure including nodes that correspond to text that will be visually displayed when executed by the client device. The method also includes comparing, by the system of one or more computers, nodes corresponding to text of the first data structure with nodes corresponding to text of the second data structure to identify the nodes corresponding to text that will not be visually displayed from the web page when executed by the client device. The method also includes generating, by the system of one or more computers, weighting factors for the nodes corresponding to text that will not be visually displayed from the web page when executed by the client device based on the nodes corresponding to text that will not be visually displayed from the web page.

In some implementations, the method includes generating, by the system of one or more computers, a hidden text data index for the web page based on the first data structure and the second data structure, the hidden text data index identifying nodes that correspond to text of the first data structure as hidden that will not be visually displayed when executed by the client device. In some implementations, the method includes receiving, by the system of one or more computers, a search query from a client device, the search query including one or more query terms and includes identifying, by the system of one or more computers, multiple candidates of text responsive to the terms of the search query, the multiple candidates of text includes text that will be visually displayed from the web page and text that will not be visually displayed from the web page, and includes selecting, by the system of one or more computers, text that is responsive to the terms of the search query from the multiple candidates of text based on the weighting factors.

In some implementations, the weighting factors are generated based on the amount of hidden text in the web page. In some implementations, the method includes selecting, by the system of one or more computers, a second set of text in response to the search query based on the weighting factors. In some implementations, the method includes displaying a list of search results, including the text that is responsive to the search query, in a rank order based on the weighting factors. In some implementations, the second data structure is associated with text to be rendered by the client device when executed by the client device.

In some implementations, text that will not be visually displayed upon execution includes text that is one or more of the following: 1) designated to be displayed using a font size below a predetermined font size threshold, 2) designated to be displayed using a font color that matches a designated background display color, or 3) text included in the first data structure, but, not in the second data structure. In some implementations, the second data structure includes nodes that correspond only to text that will be visually displayed when executed by the client device.

Another implementation is a system for providing computerized search results to a user. The system includes a processor and a memory, where the memory includes instructions that when executed cause the processor to generate a first data structure based on a web page, where the first data structure includes nodes corresponding to text that will be visually displayed from the web page and text that will not be visually displayed from the web page when executed by a client device. The instructions, when executed, cause the processor to generate a second data structure for the web page based on the first data structure, the second data structure including nodes that correspond to text that will be visually displayed when executed by the client device. The instructions, when executed, cause the processor to generate a hidden text data index for the web page based on the first data structure and the second data structure, the hidden text data index identifying nodes that correspond to text of the first data structure as hidden that will not be visually displayed when executed by the client device. The instructions, when executed, cause the processor to generate weighting factors for the nodes corresponding to text that will not be visually displayed from the web page when executed by the client device based on the nodes corresponding to text that will not be visually displayed from the web page.

In some implementations, the memory includes instructions that when executed cause the processor to receive a search query from a client device, the search query including one or more query terms, to identify multiple candidates of text responsive to the terms of the search query, the multiple candidates of text includes text that will be visually displayed from the web page and text that will not be visually displayed from the web page, and to select text that is responsive to the terms of the search query the search query from the multiple candidates of text based on the weighting factors.

In some implementations, the memory includes instructions that when executed cause the processor to generate the weighting factor based on the amount of hidden text in the web page. In some implementations, the memory includes instructions that when executed cause the processor to display a list of search results including text that is responsive to the search query in a rank order based on the weighting factors. In some implementations, the second data structure is associated with text to be rendered by the client device when executed by the client device.

Another implementation features a method for creating a hidden text data index for ranking computerized query search results. The method includes generating, by a system of one or more computers, a document object model (DOM) tree for a first web page, where the DOM tree includes nodes corresponding to text that will be visually displayed and nodes corresponding to text that will not be visually displayed when executed by a client device. The method also includes generating, by the system of one or more computers, a render tree based on the DOM tree, the render tree including nodes that correspond to text that will be visually displayed by a client device when executed by the client device. The method also includes comparing, by the system of one or more computers, nodes corresponding to text of the DOM tree with nodes corresponding to text of the render tree to identify the nodes corresponding to text of the DOM tree that will not be visually displayed when executed by the client device. The method also includes creating, by the system of one or more computers, a hidden text data index based on the DOM tree and the render tree, the hidden text data index identifying nodes corresponding to text of the DOM tree as hidden that will not be visually displayed when executed by the client device and including a weighting factor associated with the identified nodes.

In some implementations, the method includes generating, by the system of one or more computers, a second document object model (DOM) tree for a second web page, where the second DOM tree includes nodes corresponding to text that will be visually displayed and nodes corresponding to text that will not be visually displayed when executed by the client device, generating, by the system of one or more computers, a second render tree based on the second DOM tree, the second render tree including nodes that correspond to text that will be visually displayed by a client device when executed by the client device, comparing, by the system of one or more computers, nodes corresponding to text of the second DOM tree with nodes corresponding to text of the second render tree to identify the nodes corresponding to text in the second DOM tree that will not be visually displayed when executed by the client device, and updating, by the system of one or more computers, the hidden text data index based on the second DOM tree and the second render tree, the hidden text data index identifying nodes corresponding to text of the second DOM tree as hidden that will not be visually displayed when executed by the client device and including a weighting factor associated with the identified nodes.

In some implementations, the render tree is associated with text to be rendered by the client device when executed by the client device. In some implementations, text that will not be visually displayed upon execution includes text that is one or more of the following: 1) designated to be displayed using a font size below a predetermined font size threshold, 2) designated to be displayed using a font color that matches a designated background display color, or 3) text included in the first data structure, but, not in the second data structure.

One or more of the implementations described herein can provide one or more of the following advantages. Text which is not visible (or not readily visible) upon page-load of a web page is less likely to show up in the short textual descriptions that accompany search results, thereby increasing user satisfaction of the search results. The quality of the results provided to a user in response to a search query can be improved because search result scores for web pages that have hidden text that would otherwise cause a user to select a specific search result is weighted, e.g., negative weight for the hidden text, hidden text is not displayed as snippet for the search result, so a user is less likely to select the search result. The quality of the results provided to a user can be improved because search result scores are less and/or the hidden text is not displayed as the snippet for web pages having hidden text that would otherwise cause the score to be higher or the hidden text to be displayed as the snippet.

Other aspects and advantages of the technology will become apparent from the following detailed description, taken in conjunction with the accompanying drawings, illustrating the principles of the technology by way of example only.

BRIEF DESCRIPTION OF THE DRAWINGS

The foregoing features of various implementations will be more readily understood by reference to the following detailed descriptions in the accompanying drawings.

FIGS. 3A-3B depict screenshots illustrating example displayed web pages, according to an illustrative implementation.

FIGS. 3C-3D depict example HTML code for the web pages of FIGS. 3A-3B, respectively, according to an illustrative implementation.

DETAILED DESCRIPTION

Implementations described in this disclosure cause text which is not visible upon page-load, e.g., text in a drop-down menu, text in a hover menu, non-visible text, to be less likely to show up in snippets for a web page search result. Hidden text (also referred to as tokens) for web pages is stored in a hidden text data index, e.g., listing of hidden text and location, database of hidden text, and the hidden text data index is utilized in snippet, e.g., words associated with the search result, paragraph associated with the search result, generation for display in the search results. For example, the snippet generation can utilize a weighting factor for the hidden text to decide whether to use the hidden text or some other text associated with the web page, e.g., visible text in the web page, an image in the web page.

The users of the search results can utilize the snippets to make decisions about which web page to access in the search results based on the snippets, e.g., web page for automobile reviews includes a listing of different automobile types, web page for apple prices includes a listing of apple prices. In one implementation, when web page search result snippets are generated, for hidden text that is part of the snippet, the technology calculates the proportion of hidden text to visible text, e.g., web page includes 80% hidden text and 20% visible text, web page is ⅓ hidden text. The technology applies a weighting factor, e.g., demotion, promotion, to text that includes a large proportion of hidden text, e.g., hidden text is weighted by −10 demotion, visible text is selected before hidden text. This decreases the chance that text with substantial hidden text will become part of a snippet provided to a user in response to a search query, thereby increasing the chance that the user is provided with responses that properly respond to the search query.

Figure 1:
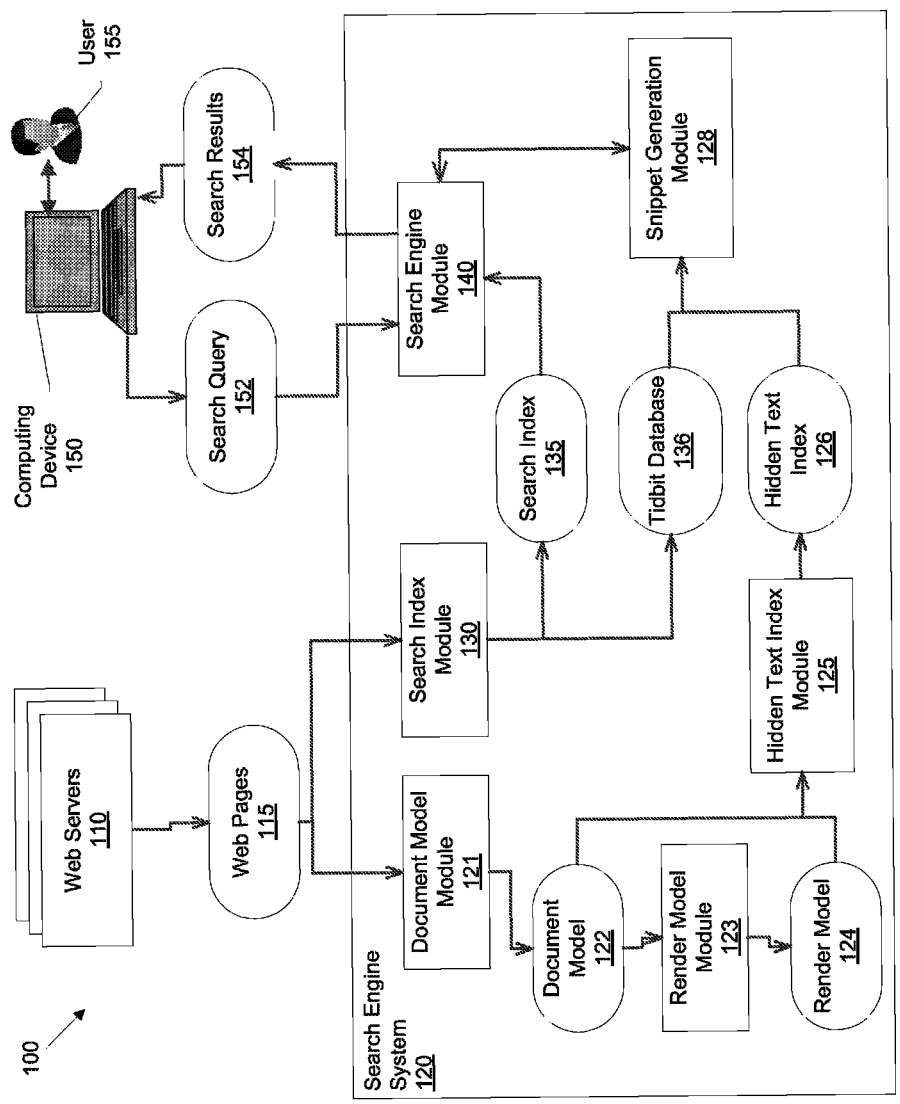
FIG. 1 is a process diagram of an example environment for hidden text detection, according to an illustrative implementation.

FIG. 1 is a process diagram of an example environment 100 for hidden text detection. The environment 100 includes web servers 110, a search engine system 120, and a computing device 150. The web server 110 store and provide web pages 115, e.g., hypertext mark-up language (html) formatted pages, mixed format pages, to the search engine system 120 and/or to the computing device 150. A user 155 can utilize the computing device 150 to view one or more of the web pages 115. Although FIG. 1 does not illustrate a connection between the web servers 110 and the computing device 150, the web server 110 and the computing device 150 can be connected via any type of network, e.g., local area network (LAN), wide area network (WAN).

The search engine system 120 receives the web pages 115 from the web server 110 in response to requests for the web pages 115, e.g., page-by-page request, directory download request. A search index module 130 generates a search index 135, e.g., a listing of search terms and related web pages, a summary of each web page and reference to the web page, and a tidbit database 136, e.g., listing of snippets and weighting factors related to each snippet, reference to available snippets in each web page and weights related to the reference, based on the web pages 115. The tidbit database 136 can be generated based on the text in the web page and the weighting factor can be generated based on the number of times a term appears in the text. For example, for web page A, the tidbit is apples with a weighting factor of +10 promotion since the term appears ten times in the web page A. The tidbit database 136 can be generated based on any part of the web page and the weighting factor for each tidbit, e.g., word, sentence, can be generated based on any aspect of the tidbit, e.g., length, occurrence, commonality.

A document model module 121 generates a document model 122 (also referred to as a document object model (DOM) tree and/or a data structure) based on one of the web pages 115. The document model 122 can be a standardized listing of all of the parts of the respective web page. The document model 122 can include a plurality of nodes that correspond to text in the web page. For example, each part of the text in the web page, e.g., content text, mark-up text, corresponds to a node in the document model 122, e.g., the text apple is a node, the mark-up <p> is a node. The document model 122 can be a tree of the parts of the respective web page providing a hierarchy data structure of the respective web page, e.g., formatting data, content data.

A render model module 123 generates a render model 124 (also referred to as a render tree and/or a data structure) based on the document model 122. The render model 124 can be a standardized listing of all of the parts of the respective web page that are visible to a user, e.g., the user 155 utilizing the computing device 150. In other words, the render model module 123 processes the document model 122 to identify the parts of the respective web page that are visible to a user, e.g., graphically displayed on a screen, viewable by a user without interaction. The render model 124 can include a plurality of nodes that correspond to visible text in the web page. For example, each part of the text in the web page, e.g., content text, visible text, corresponds to a node in the render model 124, e.g., the visible text apple is a node, the visible text orange is a node.

A hidden text index module 125 generates a hidden text index 126 based on the document model 122 and the render model 124. The hidden text index 126 can be a listing of the hidden text in the web pages 115 and a reference to the web pages 115. For example, the hidden text index 126 includes: Web Page A—Car A, Car B, and Car C; and Web Page B—Actor A, Actor B, and Actor C. In this example, the information in the hidden text index 126 is embedded into hover menus in the respective web pages and is not visible to the users of the web page without interaction, that is, the information is hidden upon the user viewing the respective web page. In some implementations, the hidden text index module 125 compares the nodes of text in the document model 122 and the nodes of text in the render model 124 to generate the hidden text for the hidden text index 126, e.g., comparison of the nodes of text. Table 1 illustrates an exemplary hidden text index.

TABLE 1

Exemplary Hidden Text Index

| Web Page Identifier | Hidden Text |
|---|---|
| Web Page A | Car A, Car B . . . |
| Web Page D | Actor A, Actor B . . . |
| Web Page Z | Apple A - $56.99 a Bag |

In some implementations, the hidden text index module 125 generates the hidden text index 126 by comparing the document model 122 and the render model 124 to identify the differences. The differences between the document model 122 and the render model 124 can be indicative of the hidden text for the respective web page. For example, the document model 122 includes the menu options of Car A, Car B, and Car C, and the render model 124 does not include the menu options of Car A, Car B, and Car C since these menu options are not visible to the user upon display of the web page. In this example, the hidden text index 126 includes a reference to the respective web page, e.g., uniform resource locator (URL), reference to an URL identifier in the search index 135, and the hidden text information.

In some implementations, the hidden text index module 125 generates a weighting factor, e.g., demotion, promotion, for each web page in the hidden text index 126 based on an amount of hidden text in the respective web page, e.g., −5 demotion when hidden text is greater than twenty words, −8 demotion for all hidden text, a ratio of hidden text to visible text in the respective web page, e.g., −4 demotion when the ratio is above 1 part hidden text to 3 parts visible text, +2 promotion when the ratio is below 2% hidden text, and/or any other type of weighting of hidden text in the respective web page, e.g., hidden text is only used for a snippet when there is no visible text, location of hidden text in the respective web page. Table 2 illustrates exemplary weighting factors of hidden text. As illustrated in Table 2, the weighting factor for the hidden text can be based on any type of factor.

TABLE 2

Exemplary Demotion of Hidden Text

| Web Page Identifier | Hidden Text | Factors | Weighting Factor |
|---|---|---|---|
| Web Page A | Car A, Car B . . . | Hidden Text is 70% of the Text in the Web Page | −25 Demotion |

TABLE 2-continued

Exemplary Demotion of Hidden Text

| Web Page Identifier | Hidden Text | Factors | Weighting Factor |
|---|---|---|---|
| Web Page D | Actor A, Actor B . . . | Hidden Text is Ten Words in Length | No Factor |
| Web Page Z | Apple A - $56.99 a Bag | Hidden Text Exists | −5 Demotion |

The generation of the search index 135, the tidbit database 136, and/or the hidden text index 126 can occur at pre-determined intervals, e.g., daily, hourly, weekly, at dynamically generated intervals, e.g., hourly for web pages above a certain click-through amount, randomly generated intervals to lower network congestion, and/or upon request by a network administrator and/or a user. In some implementations, the generation of the hidden text index 126 is an off-line process with respect to searches by users for web pages, e.g., search for the weather in Boston, search for airlines that fly to Denver. In other words, with respect to the off-line process, the generation of the hidden text index 126 occurs before and independently of the search process. In some implementation, the generation of the hidden text index 126 is an on-line process with respect to searches by users for web pages. In other words, with respect to the on-line process, the generation of the hidden text index 126 is generated based on the search process initiated by the user.

The user 155 utilizing the computing device 150 can submit a search query 152, e.g., How much do Apples Cost?; Which mid-sized sedan has the best gas mileage?, to the search engine system 120. The search engine module 140 determines search results 154 based on the search index 135, e.g., listing of search terms and associated web pages, standardized search term listing with associated web pages. The search engine module 140 communicates the search results 154 to the snippet generation module 128. The snippet generation module 128 utilizes the search results 154, e.g., Web Page A, Web Page Z, to determine a snippet for each search result listed in the search results 154 based on the tidbit database 136 and/or the hidden text index 126. The snippet generation module 128 can utilize weighting factors, e.g., promotions, demotions, multipliers, associated with each snippet to determine which snippet to utilize in the search results. Table 3 illustrates exemplary input for the snippet generation module 128. The snippet generation module 128 can utilize the input to generate the output, e.g., the snippet for display with the URL for the web page, for the search results. Table 4 illustrates exemplary output from the snippet generation module 128 based on the snippet generation module 128 utilizing the input illustrated in Table 3.

TABLE 3

Exemplary Input for Snippet Generation

| Web Page Identifier | Tidbit Input | Weighting Factor | Hidden Text Input | Weighting Factor |
|---|---|---|---|---|
| Web Page A | Car Type F, Car Type E . . . | +10 Promotion | Car A, Car B . . . | −25 Demotion |
| Web Page D | Tour Actor Mansions . . . | +2 Promotion | Actor A, Actor B . . . | −1 Demotion |
| Web Page Z | Apples for Sale | +4 Promotion | Apple A - $56.99 a Bag | −4 Demotion |

TABLE 4

Exemplary Output for Snippet Generation

| Web Page Identifier | Search Query | Snippet | Decision |
|---|---|---|---|
| Web Page A | What are the types of cars for . . . | Car Type F, Car Type E . . . | Tidbit input has higher weighting factor |
| Web Page D | Which actors live on the mansion tours? | Actor A, Actor B . . . | Substantially similar weights and search query requested list |
| Web Page Z | What type of apples are for sale? | Apples for Sale | Tidbit input has higher weight |

As illustrated in Table 4, for example, the snippet generation module 128 can select the snippet Car Type F, Car Type E . . . for the search query "What are the types of cars for . . . " based on the tidbit having a higher weighting factor than the hidden text input, weighting factor of +10 promotion compared to −25 demotion. As another example, as illustrated in Table 4, the snippet generation module 128 can select the snippet Actor A, Actor B . . . for the search query "Which actors live on the mansion tours?" based on the tidbit and the hidden text input having substantially similar weighting factors, +2 promotion versus −1 demotion, and the snippet generation module 128 determining that the search query asked for a list and the hidden text input is classified as a list. In other words, the snippet generation module 128, in this example, attempts to provide a response to the search query since the weighting factors are close, e.g., within a predefined range, within a percentage range.

The snippet generation module 128 communicates the snippet to the search engine module 140 for inclusion in the search results 154. The search engine module 140 transmits the search results 154 to the computing device 150 for viewing by the user 155.

Generally, the user 155 expects or prefers that the text of the snippet be an accurate representation of the web page that is associated with the snippet. However, in instances where the snippet provided for a specific search result includes text that is not visible to the user 155, the user 155 can be disappointed with the web page associated with the search result. The process described herein provide users with better quality search results that decreases the chance that text with substantial hidden text will become part of a snippet provided to a user in response to a search query.

Although FIG. 1 illustrates various modules, the search engine system 120 can use any type and/or combination of modules and/or devices to generate the document model 122, the render model 124, the search index 135, the tidbit database 136, the hidden text index 126 and/or the search results 154. Although FIG. 1 illustrates the search index module 130 generating the search index 135 and the tidbit database 136 based on the web pages 115, the search index module 130 can utilize the document model 122 and/or the render model 124 as input to generate the search index 135 and/or the tidbit database 136. In other words, for example, the search index module 130 can generate the search index 135 based on the document model 122.

Figure 2:
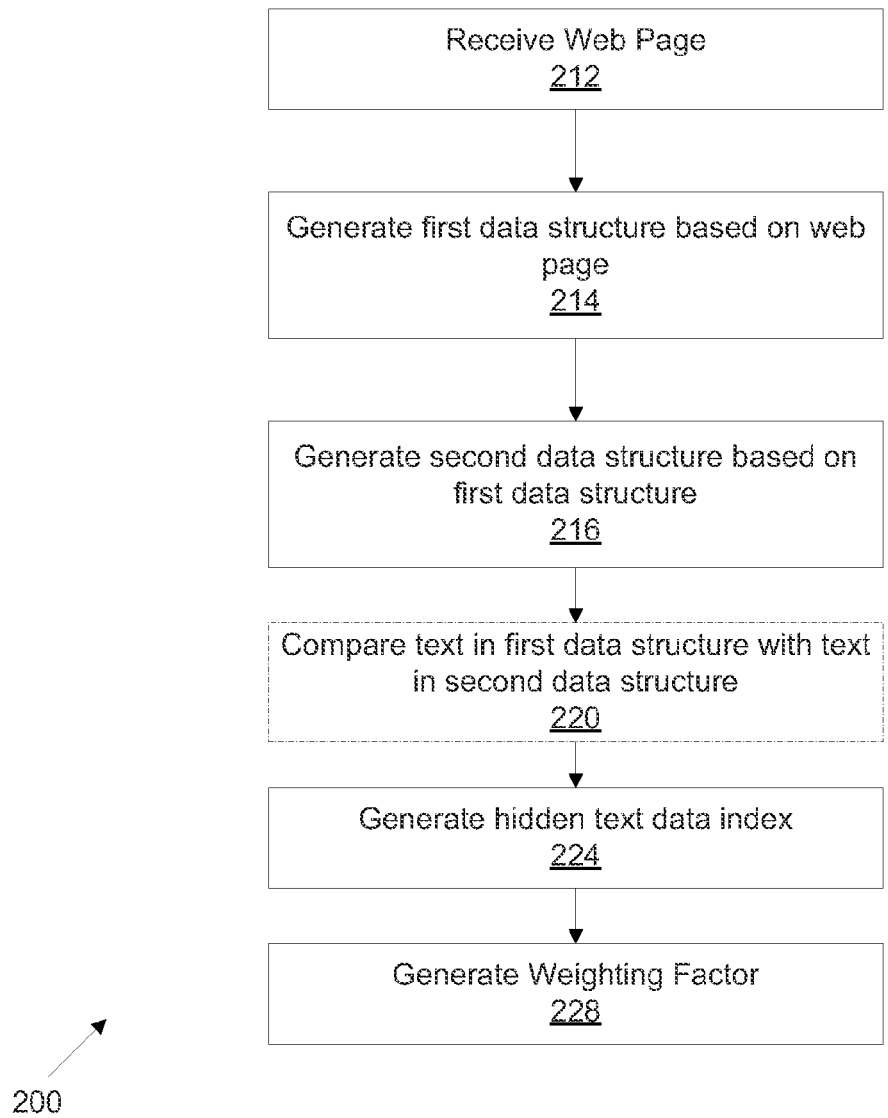
FIG. 2 is a flowchart of an example method for providing computerized search results to a user, according to an illustrative implementation.

FIG. 2 is a flowchart 200 of a method for hidden text detection and analysis, utilizing, for example, the search engine system 120 of FIG. 1. The implementation generates snippets and stores the snippets for subsequent access during search queries. The method includes receiving 212, in the search engine, a web page. The method includes generating 214 a document object model (DOM) tree, also referred to as a first data structure, for the web page, e.g., a HyperText Markup Language (HTML) page. Although HTML is discusses as the web page, the web page and/or any other documents processed by the technology described herein can be in any format.

The method includes generating 216 a render tree, also referred to as a second data structure, in the search engine, based on the DOM tree. The DOM tree includes data that will be displayed as well as data that will not be displayed. The render tree includes nodes that correspond to data that will be visually displayed when executed by the client device, e.g., viewed in a web browser on a computing device. The indexer also creates and maintains a mapping between the DOM tree and the render tree. In one implementation, the render tree is associated with text to be rendered by a client device when executed by the client device.

In some implementations, the method also includes traversing or comparing 220 text in nodes of the DOM tree with text in the nodes of the render tree to identify the nodes in the DOM tree that will not be visually displayed when the web page is displayed. The system selects a first node in the DOM tree and compares it to the nodes in the render tree. If the system does not identify a node in the render tree that matches the node in the DOM tree, the DOM tree node will not be visually displayed when the web page is displayed. If, however, the DOM tree node does match one of the render tree nodes, the DOM tree node and corresponding render tree node would be visually displayed when the web page is displayed. The indexer marks these pieces of text, for example, using an annotation that can be used to identify them later. The annotation marks bytes associated with the text in the HTML document that will not be visually displayed as hidden. Text that will not be visually displayed can be text that is, for example, one or more of the following types of text: 1) text designated to be displayed using a font size below a predetermined font size threshold, 2) text designated to be displayed using a font color that matches a designated background display color, and/or 3) any other type of text included in the first data structure, but, not in the second data structure. For example, use of inline font codes in the HTML code to change the color of the text in a portion of the document to match the background color would result in the text not being visible to the user when displaying the web page. For example, if the normal text is against a white background, designated by the HTML tag as <bgcolor="#FFFFFF">, then the text would not be visible if also designated as white by <font color="#FFFFFF">. The technology described herein identifies this text and can then affect whether it will be displayed with a search result.

In some implementations, the text that will not be visually displayed is in a hover menu or option menu that is presented to the user when the user moves a mouse over the hover menu or option menu. The following table (Table 5) is an example of code that has text that would not be visually displayed when executed by the client device because the text is provided in a hover menu. The code is a combination of HTML, cascading style sheets (CSS) that are used to describe the look of a document written in a markup language, and javascript that is used to provide enhanced user interfaces for web pages. A layout engine allows a web browser to interpret the code to render the web page. The layout engine takes the HTML, CSS, and javascript code and uses it to produce a render and DOM tree. Then, the technology described in this disclosure compares the trees to identify hidden portions of the text. The code in Table 5 positions the child item of the list ("I'm a drop-down item.") off the left edge of the web page until the parent ("Hover here to show drop-down items.") is hovered over, then returns it to its original position once the mouse moves off those elements. The child item text is hidden because it is an unordered list under an ordered list and the CSS rule specifies "left:−999." The CSS rule specifies that items fitting that criterion should be positioned off the left edge of the page.

TABLE 5

| Web Page Code Type | Code |
|---|---|
| HTML | `<ul id="list">`<br>　　`<li><a href="#">Hover here to show drop-down items.</a>`<br>　　　　`<ul>`<br>　　　　　　`<li><a href="#">I'm a drop-down item.</a><li>`<br>　　　　`</ul>`<br>　　`</li>`<br>`</ul>` |
| CSS | `<style type="text/css">`<br>`#nav li ul { /* second-level lists */`<br>　　`position: absolute;`<br>　　`background: orange;`<br>　　`width: 10em;`<br>　　`left: −999em;`<br>`}`<br>`#nav li:hover ul, #nav li.sfhover ul { /* lists nested under hovered list items */`<br>　　`left: auto;`<br>`}`<br>`</style>` |
| Javascript | `<script type="text/javascript"><!--//--><![CDATA[//><!--`<br>`sfHover = function( ) {`<br>　　`var sfEls = document.getElementById("nav").getElementsByTagName("LI");`<br>　　`for (var i=0; i<sfEls.length; i++) {`<br>　　　　`sfEls[i].onmouseover=function( ) {`<br>　　　　　　`this.className+=" sfhover";`<br>　　　　`}`<br>　　　　`sfEls[i].onmouseout=function( ) {`<br>　　　　　　`this.className=this.className.replace(new RegExp("sfhover\\b"), "");`<br>　　　　`}`<br>　　`}`<br>`}`<br>`if (window.attachEvent) window.attachEvent("onload", sfHover);`<br>`//--><!]]></script>` |

In some implementations, the text defined as not being visually displayed includes text that is located on a web page in a location that is less favored by, for example, advertisers. For example, text displayed at edges of a display may be less favored because a user is less likely to look there when reviewing the contents of the web page.

The method also includes generating 224, in the search engine, a hidden text data index using, for example, the annotation generated by the indexer described above and/or the differences between the DOM tree and the render tree, that is, what text is not being displayed to the user. The hidden text data index identifies text, also referred to as tokens or short strings, in the nodes of the DOM tree as hidden that will not be visually displayed when executed by the client device. The hidden text nodes are in the DOM tree, but, are not in the render tree. It is therefore possible for the system to locate the hidden text nodes and use the knowledge to affect what content is provided in the search result.

The method also includes generating 228, in the search engine, a weighting factor, e.g., a demotion score, a promotion score, for the subset of text, also referred to as snippet, based on the hidden text data index, the DOM tree, and/or the render tree. The weighting factor can be generated based on, for example, the amount of hidden text in the subset of text of the first search result. In some implementations, the weighting factor is used by the system to select the snippet to be used when providing the search result to the user. It may, for example, be beneficial to the user for the system to score snippets having a minimum of hidden text higher than snippets having some hidden text. This might be beneficial if the goal is to insure that the user is provided with information that responds to the query and does not require the user to click on additional links on the web page or hover over a drop down menu in order to receive the desired information.

The process 200 of FIG. 2 can be repeated for any number of web pages and/or other documents. For example, the process 200 can be utilized for each web page on a web site and/or each web page indexed by a search engine, e.g., global search engine, company-wide search engine, department-wide search engine.

FIG. 3A depicts a screenshot illustrating a displayed web page A 300a in viewable form, e.g., the form viewed by a user utilizing a computing device. In other words, a user can view the web page A 300a utilizing a computing device. As illustrated in FIG. 3A, the web page A 300a includes three hover menus 312a, 314a, and 316a. Each hover menu 312a, 314a, and 316a includes hidden text.

FIG. 3B depicts a screenshot illustrating a displayed web page B 300b in viewable form. In other words, a user can view the web page B 300b utilizing a computing device. As illustrated in FIG. 3B, the web page B 300b includes text about apples.

FIG. 3C depicts HTML code for the web page A 300a of FIG. 3A in HTML form. In other words, the web page A 300a is the viewable form by users utilizing a computing device, and the HTML code is translated by a web viewer to display the web page A 300a for the user. As illustrated in FIGS. 3A and 3C, hidden text 310c is viewable in the HTML code but not in the viewable form of the web page A 300a unless the user clicks on or hovers over the form link.

FIG. 3D depicts HTML code 300d for the web page B 300b of FIG. 3B in HTML form. In other words, the web page B 300b is the viewable form by users utilizing a computing device, and the HTML code 300d is translated by a web viewer to display the web page B 300b for the user. Since the web page B 300b does not include any hidden text, the HTML code 300d does not include any additional text besides the mark-up language. As illustrated in FIGS. 3B and 3D, the text is viewable in the HTML code and in the viewable form of the web page B 300b.

Figure 3E:
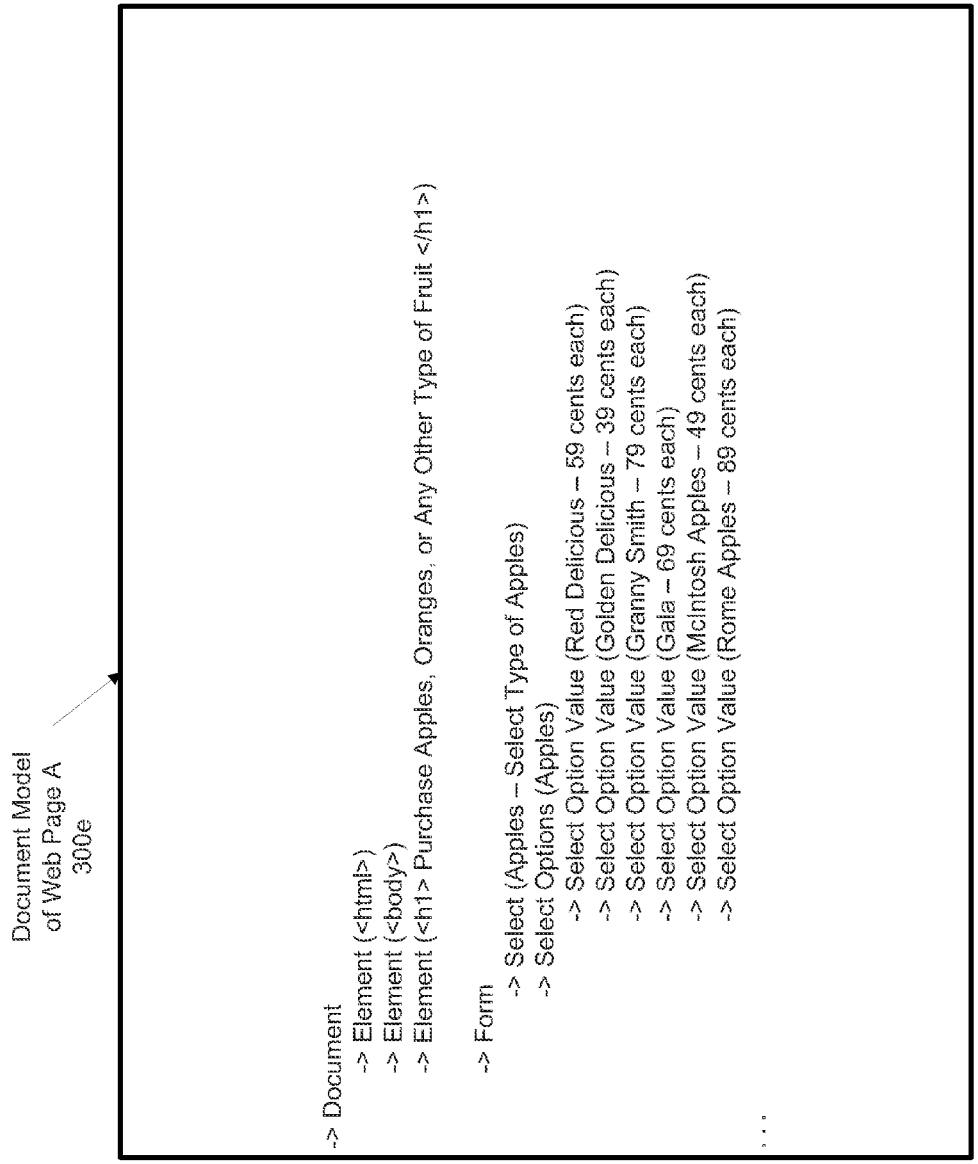
FIG. 3E depicts an example document model, according to an illustrative implementation.

FIG. 3E depicts a partial document model 300e, also referred to as DOM tree, of web page A 300a of FIG. 3A. The search engine system 120 of FIG. 1, for example, generates the document model 300e based on the web page A 300a to formalize all of the parts of the web page A 300a. The document model 300e includes nodes of text, e.g., Element (<html>), Select Options (Apples). The document model 300e includes the viewable and non-viewable parts of the web page A 300a.

Figure 3F:
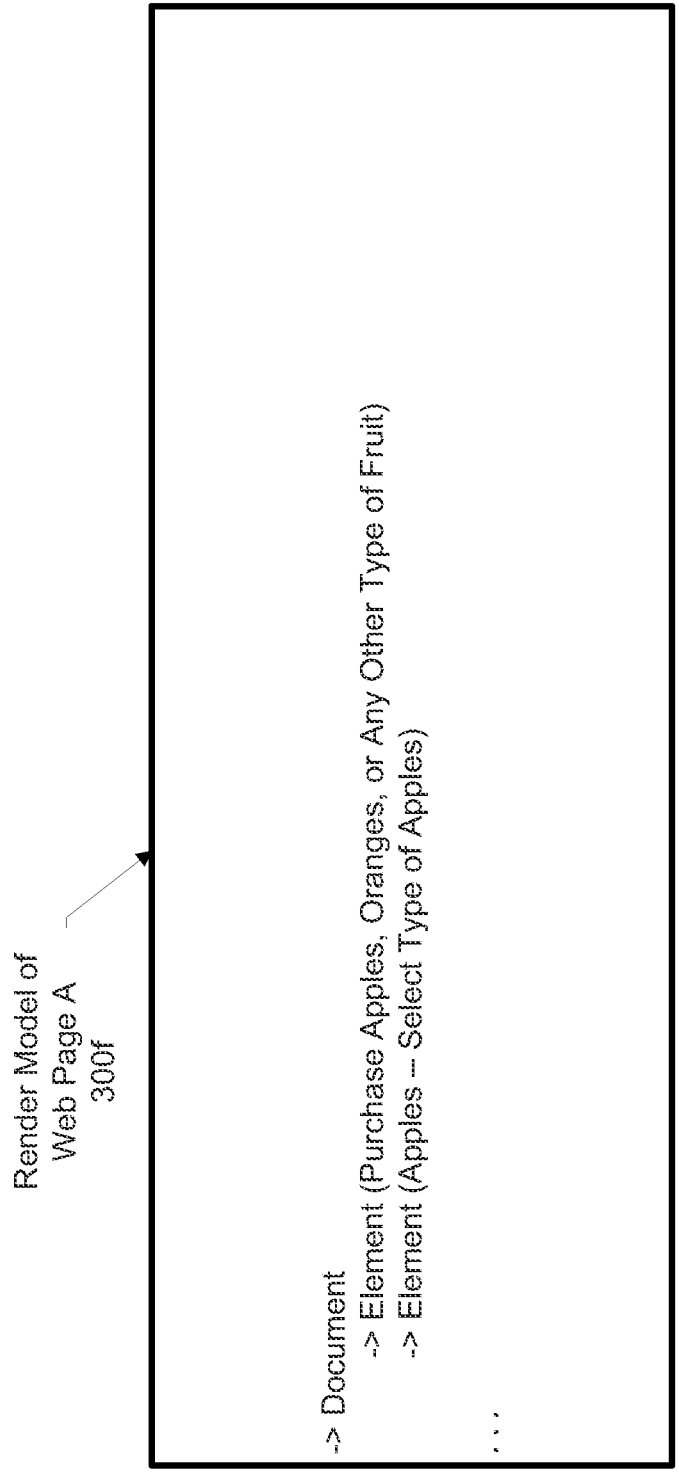
FIG. 3F depicts an example render model, according to an illustrative implementation.

FIG. 3F depicts a partial render model 300f, also referred to as render tree, of web page A 300a of FIG. 3A. The search engine system 120 of FIG. 1, for example, generates the render model 300f based on the document model 300e to formalize all of the viewable parts of the web page A 300a. The render model 300f includes nodes of text, e.g., Element (Apples—Select Type of Apples). As illustrated in FIG. 3F, the apples types in the hover menu are not viewable and are not displayed in the render model 300f.

Figure 3G:
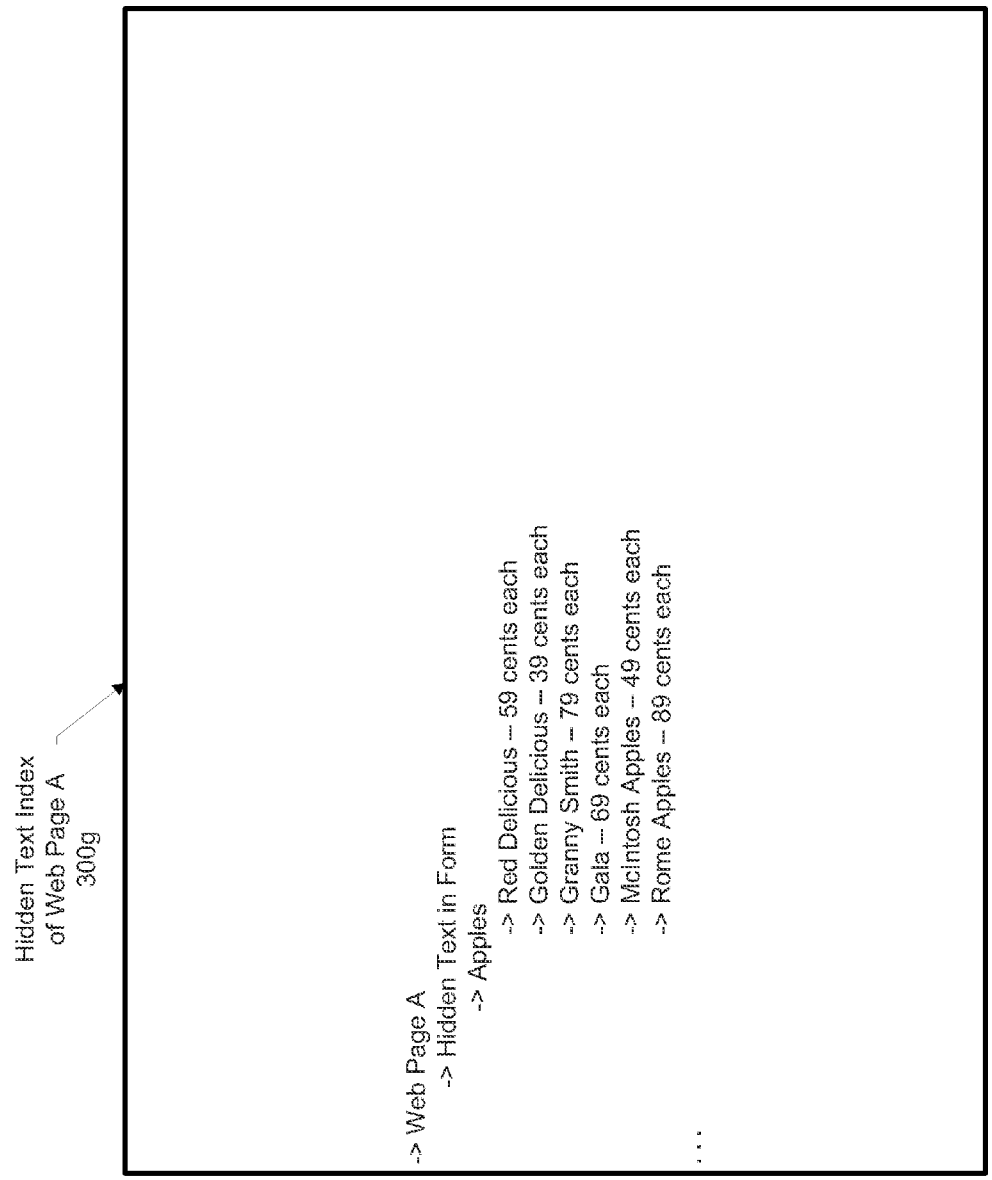
FIG. 3G depicts an example hidden text index, according to an illustrative implementation.

FIG. 3G depicts a partial hidden text index 300g of web page A 300a of FIG. 3A. The search engine system 120 of FIG. 1, for example, generates the hidden text index 300g based on the differences between the document model 300e and the render model 300f. In other words, the hidden text index 300g is a listing of the text and/or other information not directly viewable by the user of a web page. As illustrated in the hidden text index 300g, the apple types are listed in the hidden text index 300g since the apple types are not viewable, as illustrated in the web page A 300a of FIG. 3A, except by the user interacting with the hover menu.

Figure 4A:
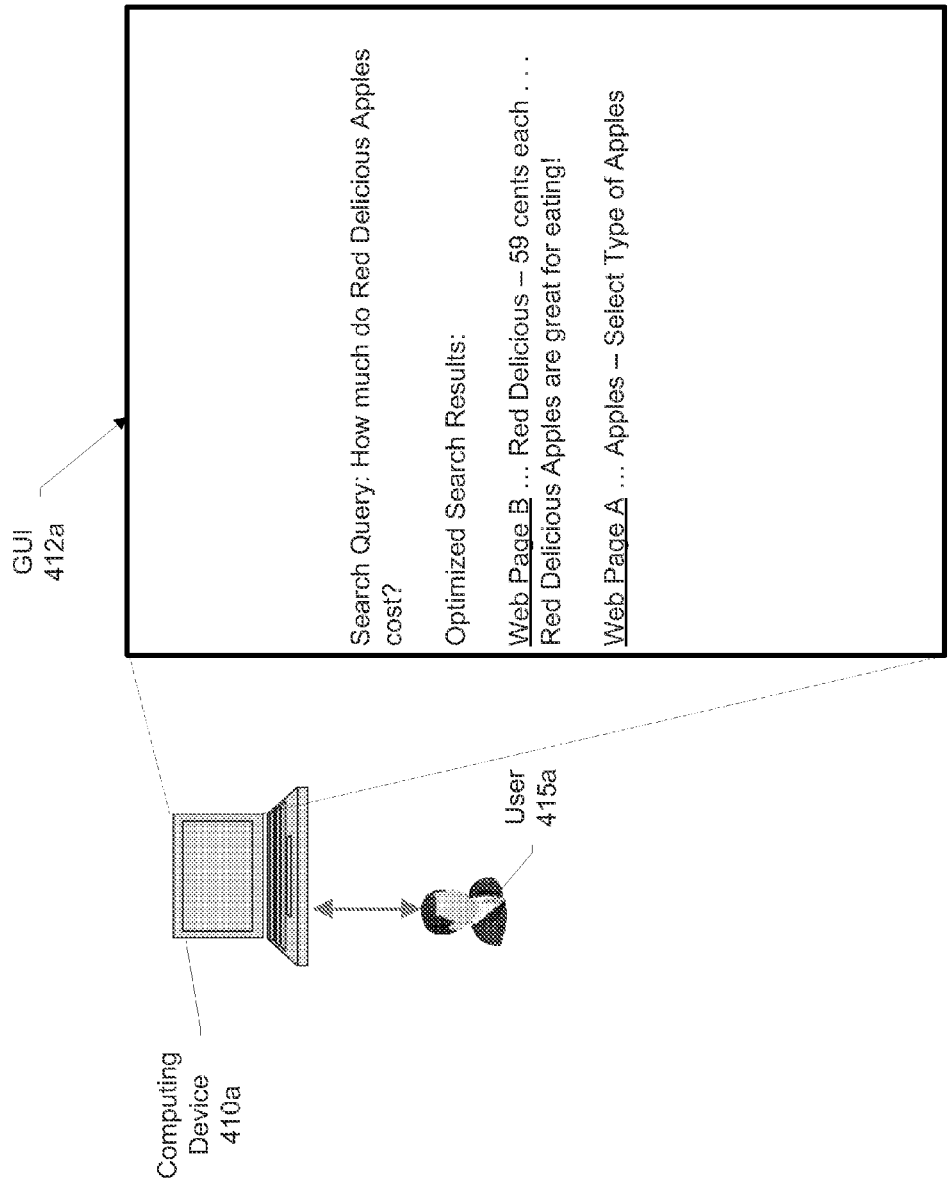
FIG. 4A depicts a screenshot illustrating an example search result using the technology.

FIG. 4A depicts a screenshot illustrating a search result, referred to as optimized search results, using the technology. A user 415a utilizes a computing device 410a to input a search query and view optimized search results using a graphical user interface (GUI) 412a. In this example, the user 415a inputs the search query "How much do Red Delicious Apples cost?" The computing device 410a communicates the search query to the search engine system 120 of FIG. 1, for example, and receives the optimized search results from the search engine system 120. The computing device 410a displays the optimized search results via the GUI 412a.

As illustrated in FIG. 3A, the web page A 300a does not have the listing of the cost of the Red Delicious Apples directly viewable on the web page, but the user would be required to select the hover menu to view the price. In other words, the price of the Red Delicious Apples is hidden text. In contrast, as illustrated in FIG. 3B, the web page B 300b does list the cost of the Red Delicious Apples directly on the web page, so the user could view the price of Red Delicious Apples without any further interaction. In this example, the technology does not display the hidden text, the hover menu text, as a snippet for the web page A 300a, but instead displays the viewable text for the web page A 300a ("Apples—Select Type of Apples"). The technology displays the viewable text for the web page B 300b as the snippet ("Red Delicious—59 cents each . . . "). The display of the viewable text for the web page in the snippet advantageously provides a higher customer satisfaction rate for the search results by ensuring that the information shown in the snippet on the linked web page is directly viewable on the linked web page. In other words, the user does not have to search for the information shown in the snippet once the user goes to the web page.

In operation, for example, the technology can generate a weighting factor of −10 demotion for the snippet of hidden text ("Red Delicious—59 cents each") of the web page A 300a, a weighting factor of +5 promotion for the snippet of visible text ("Apples—Select Type of Apples") of the web page A 300a, and a weighting factor of +5 promotion for the snippet of visible text ("Red Delicious—59 cents each . . . ") of the web page B 300*b*. In this example, the technology can determine not to display the snippet of hidden text of the web page A 300*a* but to instead display the visible text of the web page A 300*a* since the weighting factor of the visible text is greater than the weighting factor of the hidden text. The technology can determine to display the snippet of visible text of the web page B 300*b* based on the weighting factor of +5 promotion.

Figure 4B:
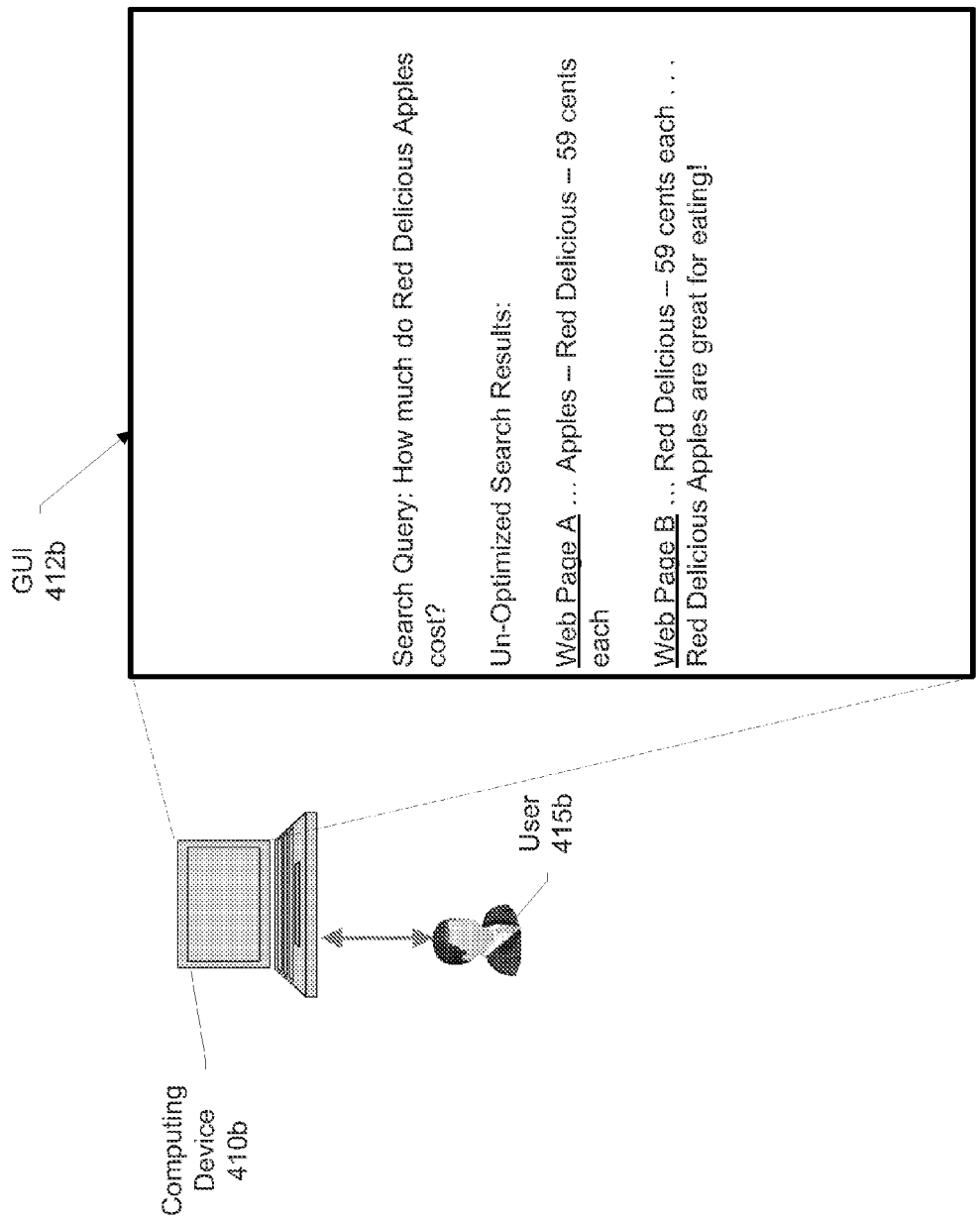
FIG. 4B depicts a screenshot illustrating an example search result without using the technology.

FIG. 4B depicts a screenshot illustrating an example search result, referred to as un-optimized search results, without using the technology. A user 415*b* utilizes a computing device 410*b* to input a search query and view un-optimized search results using a graphical user interface (GUI) 412*b*. In this example, the user 415*b* inputs the search query "How much do Red Delicious Apples cost?" The computing device 410*b* communicates the search query to the search engine system 120 of FIG. 1, for example, and receives the un-optimized search results from the search engine system 120. The computing device 410*b* displays the un-optimized search results via the GUI 412*b*. In contrast to FIG. 4A, the snippet for the web page A 300*a* of FIG. 3A includes the hidden text ("Apples—Red Delicious—59 cents"). If the user selects the web page A 300*a* from the search results, the snippet is not viewable by the user on the web page A 300*a* without user interaction on the web page A 300*a*, that is, selecting the hover menu. In this example, the customer satisfaction for the search result most likely would be lower since the user will not be able to directly view the snippet displayed in the search results on the selected web page.

Figure 5:
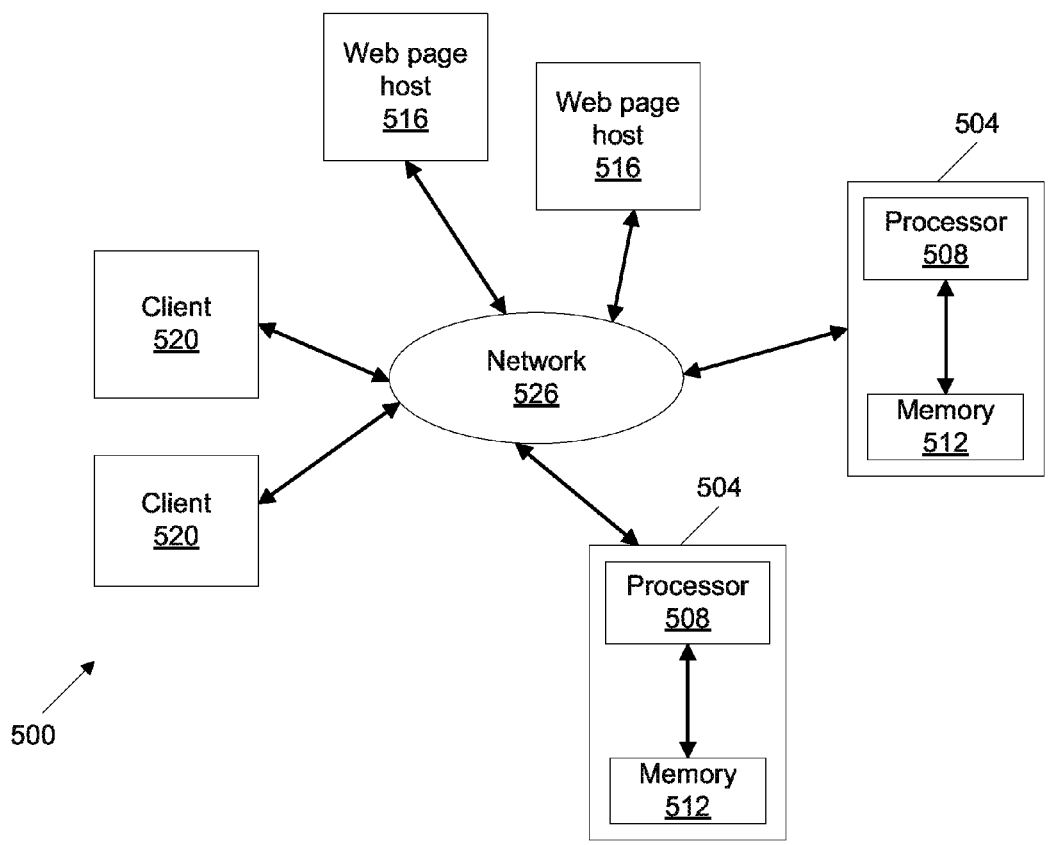
FIG. 5 is a schematic illustration of an example environment in which the systems and methods described herein may be implemented.

FIG. 5 is a schematic illustration of an exemplary environment 500 in which the systems and methods described herein may be implemented. The environment 500 includes one or more computer servers 504 for creating hidden text data indices and for providing computerized search results to a user for web pages provided by one or more web page hosts 516. The user inputs search queries using a client device 520. Each server 504 includes processors 508 coupled to memory 512. The web page hosts 516 provide web pages to the processors 508 via a network 524. In this implementation, the memory 512 includes code representing instructions that when executed cause the processor 508 to execute steps 212, 214, 216, 220, 224, and 228 of FIG. 2 to generate a hidden text index for the nodes.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a computer readable medium, to control the operation of data processing apparatus. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, or a game console.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, the type of feedback provided to the user can be any form of sensory feedback, e.g., visual feedback, auditory feedback, or tactile feedback, and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Particular implementations of the subject matter described in this specification have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing implementations are therefore to be considered in all respects illustrative rather than limiting of the implementations described herein. Scope is thus indicated by the appended claims, rather than by the foregoing description, and all changes that come within the meaning and range of equivalency of the claims are therefore intended to be embraced therein.

The invention claimed is:

1. A system comprising:
one or more computer devices to:
identify a web page relating to a search query,
the search query being provided by a device of a user;
identify:
hidden text, of the web page, relating to the search query, and
visible text, of the web page, relating to the search query;
determine at least one of a score for the hidden text or a score for the visible test,
the score for the hidden text being based on an amount of the hidden text in the web page;
generate a snippet of text of the web page,
the snippet of text, of the web page, including a portion of the visible text and excluding the hidden text based on the at least one of the score for the hidden text or the score for the visible text; and
generate a search result page that includes information regarding the web page,
the information regarding the web page including the snippet of text of the web page,
the search result page being provided to the device of the user.

2. The system of claim 1, where, when determining the score for the hidden text, the one or more computer devices are to:
determine the score for the hidden text based on a quantity of words in the hidden text.

3. The system of claim 1, where, when determining the at least one of the score for the hidden text or the score for the visible text, the one or more computer devices are to:
determine the score for the hidden text further based on a ratio of a quantity of words in the hidden text to a total quantity of words in the web page.

4. The system of claim 1, where the snippet of text, of the web page, includes the portion of the visible text and excludes the hidden text based on the score for the visible text exceeding the score for the hidden text.

5. The system of claim 1, where the hidden text includes one or more of:
text to be displayed using a font size that does not meet a font size threshold, or
text to be displayed using a font color that matches a background color associated with the web page.

6. A method comprising:
identifying, by one or more computer devices, a web page relating to a search query,
the search query being provided by a device of a user;
identifying by the one or more computer devices:
hidden text, of the web page, relating to the search query, and
visible text, of the web page, relating to the search query;
determining, by the one or more computer devices, at least one of a score for the hidden text or a score for the visible text,
the score for the hidden text being based on an amount of the hidden text in the web page;
selecting, by the one or more computer devices, a snippet of text for the web page,
the snippet of text, of the web page, including a portion of the visible text and excluding the hidden text based on the at least one of the score for the hidden text or the score for the visible text; and
generating, by the one or more computer devices, a search result page that includes information regarding the web page,
the information regarding the web page including the snippet of text of the web page,
the search result page being provided to the device of the user.

7. The method of claim 6, further comprising:
determining a score for a first snippet of text that includes the hidden text and does not include the visible text,
the score for the first snippet of text being based on the score for the hidden text;
determining a score for a second snippet of text that includes the visible text and does not include the hidden text,
the score for the second snippet of text being based on the score for the visible text, where selecting the snippet of text includes selecting the second snippet of text as the snippet of text for the web page based on the score for the second snippet of text and the score for the first snippet of text.

8. The method of claim 7, where selecting the second snippet of text includes:
selecting the second snippet of text based on the score for the second snippet of text exceeding the score for the first snippet of text.

9. The method of claim 6, where the hidden text includes one or more of:
text to be displayed using a font size that does not meet a font size threshold, or
text to be displayed using a font color that matches a background color associated with the web page.

10. The method of claim 6, where the snippet of text, of the web page, includes the portion of the visible text and excludes the hidden text based on the score for the visible text exceeding the score for the hidden text.

11. A system comprising:
one or more computer devices to:
identify a first web page and a second web page relating to a search query,
the search query being provided by a device of a user;
determine one or more values for the first web page,
the one or more values for the first web page including at least one of:
a value for first visible text, of the first web page, relating to the search query, or
a value for first hidden text, of the first web page, relating to the search query,
the value for the first hidden text being based on an amount of the first hidden text in the first web page;
determine one or more values for the second web page,
the one or more values for the second web page including at least one of:
a value for second visible text, of the second web page, relating to the search query, and
a value for second hidden text, of the second web page, relating to the search query or,
the value for the second hidden text being based on an amount of the second hidden text in the second web page;
generate a search result page that includes information regarding the first web page and information regarding the second web page,
the information regarding the first web page including a title of the first web page, one or more terms of the search query, and additional text from the first web page,
the information regarding the second web page including a title of the second web page, one or more terms of the search query, and additional text from the second web page,
the information regarding the first web page and the information regarding the second web page being ranked based on:
the one or more values for the first web page, and
the one or more values for the second web page.

12. The system of claim 11, where the first web page includes the first hidden text,
where the second web page does not include the second hidden text, and
where the one or more values for the second web page exceed the one or more values for the first web page based on:
the first web page including the first hidden text, and
the second web page not including the second hidden text.

13. The system of claim 11, where, when generating the search result page, the one or more computer devices are to:
rank the information regarding the second web page higher than the information regarding the first web page based on the one or more values for the second web page exceeding the one or more values for the first web page.

14. The system of claim 11, where the first web page includes the first hidden text, and
where the one or more computer devices are further to:
determine a score for a first snippet of text, of the first web page, that includes at least a portion of the first hidden text and does not include the first visible text;
determine a score for a second snippet of text, of the first web page, that includes the first visible text and does not include the first hidden text; and
select the second snippet of text based on the score for the second snippet of text exceeding the score for the first snippet of text,
where the information regarding the first web page includes the second snippet of text.

15. The system of claim 14, where the score for the first snippet of text is based on a score for the first hidden text, and
where the score for the second snippet of text is based on a score for the first visible text.

16. A method comprising:
identifying, by one or more computer devices, a first web page and a second web page relating to a search query,
the search query being provided by a device of a user;
determining, by the one or more computer devices, one or more values for the first web page,
the one or more values for the first web page including at least one of:
a value for first visible text, of the first web page, relating to the search query, or
a value for first hidden text, of the first web page, relating to the search query,
the value for the first hidden text being based on an amount of the first hidden text in the first web page;
determining, by the one or more computer devices, one or more values for the second web page,
the one or more values for the second web page including at least one of:
a value for second visible text, of the second web page, relating to the search query, or
a value for second hidden text, of the second web page, relating to the search query,
the value for the second hidden text being based on an amount of the second hidden text in the second web page;
generating, by the one or more computer devices, a search result page that includes information regarding the first web page and information regarding the second web page,
the information regarding the first web page including a title of the first web page, one or more terms of the search query, and additional text from the first web page, the information regarding the second web page including a title of the second web page, one or more terms of the search query, and additional text from the second web page, the information regarding the first web page and the information regarding the second web page being ranked based on:
the one or more values for the first web page, and
the one or more values for the second web page.

17. The method of claim 16, where the first web page includes the first hidden text, and
where the method further comprises:
determining a score for a first snippet of text, of the first web page, that includes the first hidden text and does not include the first visible text;
determining a score for a second snippet of text, of the first web page, that includes at least a portion of the first visible text and does not include the first hidden text; and
selecting the second snippet of text based on the score for the second snippet of text and the score for the first snippet of text,
where the information regarding the first web page includes the second snippet of text.

18. The method of claim 17, where the score for the first snippet of text is based on a score for the first hidden text, and where the score for the second snippet of text is based on a score for the first visible text.

19. The method of claim 16, where generating the search result page includes:
determining that the one or more values for the second web page exceed the one or more values for the first web page; and
ranking the information regarding the second web page higher than the information regarding the first web page based on determining that the one or more values for the second web page exceed the one or more values for the first web page.

20. The method of claim 19, where the first web page includes the first hidden text,
where the second web page does not include the second hidden text, and
where determining that the one or more values for the second web page exceed the one or more values for the first web page includes:
determining that the one or more values for the second web page exceed the one or more values for the first web page based on:
the first web page including the first hidden text, and
the second web page not including the second hidden text.

* * * * *